(12) United States Patent
Sukhomlinova et al.

(10) Patent No.: US 9,200,203 B2
(45) Date of Patent: Dec. 1, 2015

(54) PHOTOTROPIC LIQUID CRYSTAL MATERIAL AND PROCESSES

(75) Inventors: Ludmila Sukhomlinova, Kent, OH (US); Tamas Kosa, Hudson, OH (US); Bahman Taheri, Shaker Heights, OH (US); Timothy White, Centerville, OH (US); Timothy Bunning, Beavercreek, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 193 days.

(21) Appl. No.: 13/990,072

(22) PCT Filed: Nov. 29, 2011

(86) PCT No.: PCT/US2011/062299
§ 371 (c)(1),
(2), (4) Date: May 29, 2013

(87) PCT Pub. No.: WO2012/074956
PCT Pub. Date: Jun. 7, 2012

(65) Prior Publication Data
US 2013/0248350 A1 Sep. 26, 2013

Related U.S. Application Data

(60) Provisional application No. 61/417,615, filed on Nov. 29, 2010.

(51) Int. Cl.
*C09K 19/60* (2006.01)
*C09K 19/54* (2006.01)

(52) U.S. Cl.
CPC ............... *C09K 19/54* (2013.01); *C09K 19/60* (2013.01)

(58) Field of Classification Search
CPC .................. C09K 19/54; C09K 19/60
See application file for complete search history.

(56) References Cited

U.S. PATENT DOCUMENTS

| | | | |
|---|---|---|---|
| 2007/0024970 A1* | 2/2007 | Lub et al. ............... | 359/487 |
| 2008/0292817 A1 | 11/2008 | Takaku et al. ............... | 428/1.1 |
| 2009/0074991 A1 | 3/2009 | Youfu et al. ............... | 428/1.4 |
| 2009/0098314 A1 | 4/2009 | Takaku et al. ............... | 428/1.1 |

(Continued)

OTHER PUBLICATIONS

Chanishvili et al.; *Light Induced Effects in Cholesteric Mixtures With a Photosensitive Nematic Host*; Molecular Crystals and Liquid Crystals; vol. 409; pp. 209-218; 2004.

(Continued)

*Primary Examiner* — Shean C Wu
(74) *Attorney, Agent, or Firm* — Renner Kenner Greive Bobak Taylor & Weber

(57) ABSTRACT

A new class of phototropic liquid crystal mixture comprises a liquid crystal host and one or more photodichroic dyes, wherein exposure of the mixture to an activating light causes a light-induced increase in order parameter of the mixture. In some examples, in the absence of the activating light, the phototropic mixture has a lower order parameter than the liquid crystal host, while in the presence of activating light, the phototropic mixture has a higher order parameter than the liquid crystal host. In some examples, upon exposure to the activating light, the phototropic mixture undergoes a phase transition from a material with a lower order to a material with higher liquid crystalline order. In some examples, activating light causes the mixture to transition from an isotropic phase to a nematic phase, from an isotropic phase to a cholesteric phase or form a nematic phase to a smectic phase.

27 Claims, 7 Drawing Sheets

(56) References Cited

U.S. PATENT DOCUMENTS

| | | | |
|---|---|---|---|
| 2010/0045900 A1* | 2/2010 | Peeters et al. | 349/74 |
| 2010/0202033 A1 | 8/2010 | Aiken et al. | 359/241 |
| 2010/0267858 A1* | 10/2010 | Lub et al. | 522/108 |
| 2010/0324296 A1 | 12/2010 | Sukhomlinova et al. | 546/196 |

OTHER PUBLICATIONS

*Physical Properties of Mixtures of Low Molar Mass Nematic Liquid Crystals With Photochromic Fulgide Guest Dyes*; Allinson et al.; Liquid Crystals: An International Journal of Science and Technology; Taylor & Francis; GB; vol. 14, No. 5; Ma7 1, 1993, pp. 1469-1478.
International Search Report of corresponding application No. PCT/US2011/062299 mailed Mar. 21, 2012.
Written Opinion of corresponding application No. PCT/US2011/062299 mailed Mar. 21, 2012.
*Light-induced liquid crystallinity*; Kosa et al.; Nature, May 17, 2012; vol. 485; pp. 347-349.
*Optical switching and image storage by means of azobenzene liquid-crystal films*; Ikeda et al.; Science, Jun. 1995; vol. 268, No. 5219; pp. 1873-1875.
*Effects of the environment on the photochromic behavior of a novel indeno-fused naphthopyran*; Ortica et al.; Photochem. Photobiol. Science, 2002; vol. 2; pp. 803-808.
*Dynamic self-assembly of the liquid-crystalline smectic A phase*; Prasad et al.; Adv. Materials, 2005; vol. 17, pp. 2086-2091.
*Nonequilibrium liquid crystalline layered phase stabilized by light*; Prasad et al.; J. Phys. Chem. B., 2007; vol. 111; pp. 345-350.
*Nonlinear transmission of photosensitive cholesteric liquid crystals due to spectral bandwidth auto-tuning or restoration*; Serak et al; J. Nonlinear Opt. Phys. Mater., 2007; vol. 16, pp. 471-483.
*Deuteron NMR investigation of a photomechanical effect in a smectic-A liquid crystal*; Zalar et al.,; Phys. Rev. E, Aug. 2000; vol. 62, No. 2; pp. 2252-2262.
*Isothermal phase transition of liquid crystals inducted by photoisomerization of doped spiropyrans*; Kurihara et al.; J. Chem Soc. Faraday Trans, 1991; vol. 87, pp. 3251-3254.
*Photophysics and kinetics of naphthopyran derivatives, Part 2: Analysis of diarylnaphthopyran kinetics. Degeneracy of the kinetic solution.*; Maafi et al.; Int. J. Chem. Kinet., 2005; vol. 37, pp. 717-727.
*Room temperature photochromic liquid crystal [3H]-naphtho[2,1-b]pyrans-photochromism in the mesomorphic state*; Frigoli et al.; Chem. Commun., 2004; vol. 18, pp. 2040-2041.
*Searching for photochromic liquid crystals Spironaphthoxazine substituted with a mesogenic group*; Shragina et al.; Liq. Cryst., 1990; vol. 7, pp. 643-655.

* cited by examiner

PHOTOTROPIC LIQUID CRYSTAL MATERIAL AND PROCESSES

CROSS-REFERENCE TO RELATED APPLICATIONS

This application is a §371 application of International patent application number PCT/US2011/062299 filed Nov. 29, 2011, which claims priority to, and any other benefit of, U.S. Provisional Patent Application Ser. No. 61/417,615, filed on Nov. 29, 2010, entitled "Phototropic Liquid Crystal Material and Processes," the entire disclosure of which is fully incorporated herein by reference.

TECHNICAL FIELD

Generally, the present invention relates to phototropic liquid crystal mixtures and related devices. Specifically, the present invention relates to phototropic liquid crystals that undergo a change in order parameter upon exposure to or removal of an activating light.

BACKGROUND ART

Liquid crystals are traditionally classified as thermotropic, lyotropic, or polymeric based on the stimulus that governs the organization and order of the molecular system. Subjecting liquid crystals to a stimulus, for example by heating can decrease the ability of the material system to organize resulting in transitions from or into a number of well-known mesophases including nematic, cholesteric, numerous variations of smectic, in addition to more complicated phases such as the blue phase. To date, there has been no report of a liquid crystal mixture wherein light irradiation serves to increase the order of the system allowing for order-increasing phase transitions.

Recently, there has been growing interest in photoresponsive liquid crystals in which light can be used to remotely control physical and/or optical properties such as the color of the optical reflection band, surface tension, and mechanical properties of polymeric liquid crystalline systems. In addition to the unique capability of remote control, light can readily be spatially patterned with holography or shadow-masking, potentially useful as a photodisplay.

In the past, azobenzene photochromic compounds have predominantly been employed as the photochromic moiety of choice in the formulation of photoresponsive liquid crystal material systems because of their rod-like shape that can allow for synthesis of azobenzene-containing liquid crystal molecules as well as excellent compatibility with conventional liquid crystalline systems in guest-host mixtures.

The photosensivity of photochromic materials has been long employed as a smart material technology, in which the material autonomously cues a desired functional response, most plainly evident in variable transmission (photochromic) eyewear that darken in the presence of sufficient sunlight. Over the years, photosensitive liquid crystals systems have been realized as guest-host mixtures of liquid crystals with non-liquid crystalline photochromics, or by the synthesis and employment of photochromic liquid crystal molecules. A few reports detail employment of spiropyran, spriooxazine, and napthopryan photochromic moieties in opthamalic applications, synthesis of mesogenic molecular targets based on these photochromics, or using photochromism in a guest-host mixture. In these systems, the photochromics are a guest in the liquid crystal host and do not affect the physical or optical properties of the host liquid crystals.

In addition to simple changes in the physical properties, some photoresponsive liquid crystal materials and mixtures can undergo transitions from a higher ordered phase to a lower ordered phase if light significantly affects the order parameter of the system within a mesophase. Light exposure of previously examined photoresponsive liquid crystalline materials (guest-host or mesogenic) from their ground state results in a decrease in order, with sufficient irradiation resulting in what has been referred to as a photoinduced isothermal phase transition. Under very specialized cases, an artificial increase in order with light exposure can be achieved in some systems. In the first instance, investigators have observed increases in order in an azobenzene doped Smectic A (SmA) phase with light exposure. (A. Chanishvili, G. Chilaya, G. Petriashvili, D. Sikharulidze, Mol. Cryst. Liq. Cryst. 409, 209 (2004)). The increase in order was found to be caused by photoinduced phase separation of cis-azobenzene from the Sm layers. In other words, the system exhibited a micro phase separation of the guest dye from the host and as such was not thermodynamically stable system.

This type of unstable phase separation has also been employed to suppress a "reentrant" nematic phase to yield a higher-ordered SmA phase. The reentrant nematic phase is found to precede the appearance of the higher ordered SmA phase. Others have taken the approach of subjecting photoresponsive liquid crystals to "pre-exposure" to one color of light to drive the system to the disordered isotropic state (typically metastable), with subsequent illumination by longer wavelength light resulting in a restoration of a higher ordered, cholesteric phase. As in the previous cases, these system are thermodynamically unstable before the exposure. In short, the apparent increase in order is only due to a thermodynamically unstable situation.

To our knowledge, there are no prior reports of photoresponsive liquid crystalline systems in which light directly increases the order parameter of a thermodynamically stable liquid crystal material system without inducing a phase separation. In addition there are no reports of a light induced phase transition from isotropic to a liquid crystalline phase or transition within the different meso phases wherein the phase after exposure has a higher degree of order. Here, we present the development of a novel class of guest-host liquid crystal materials that uniquely exhibit an increase in order parameter upon irradiation. Depending on the state of the system, the materials may also be capable of yielding order-increasing phase transitions.

SUMMARY OF THE INVENTION

We describe a novel phototropic liquid crystal mixture comprising a liquid crystal host and one or more photodichroic dyes, wherein exposure of the mixture to an activating light causes a light-induced increase in order parameter of the mixture.

In some embodiments, the phototropic mixture, in the absence of the activating light has a lower order parameter than the liquid crystal host. In some examples, the mixture in the presence of the activating light has a higher order parameter than the liquid crystal host.

In some embodiments, upon exposure to the activating light, the phototropic mixture undergoes a phase transition from a material with a lower liquid crystalline order to a material with higher liquid crystalline order.

In some embodiments, in the absence of an activating light, the phototropic mixture has a lower $T_{NI}$ phase transition temperature than the liquid crystal host. In some examples, in the presence of the activating light, the phototropic mixture has a higher $T_{NI}$ phase transition temperature than the liquid crystal host.

In some embodiments, upon exposure to an activating light, the mixture undergoes transition from an isotropic material to a liquid crystalline phase.

In some embodiments, the light-induced increase in order parameter of the mixture induces a phase transition from an isotropic phase to a nematic phase.

In other embodiments, the light-induced increase in order parameter of the mixture induces a phase transition from an isotropic phase to a cholesteric phase.

In yet other embodiments, the light-induced increase in order parameter of the mixture induces a phase transition form a nematic phase to a smectic phase.

In some examples, the photodichroic dye used in the phototropic mixture is a compound comprising a non-azo-based photochromic core unit and a mesogenic group.

Also described is a method for increasing an order parameter of a liquid crystal mixture by adding a photodichroic dye to the liquid crystal mixture to make a phototropic liquid crystal mixture, and exposing said phototropic liquid crystal mixture to an activating light, thereby increasing the order parameter of the liquid crystal mixture.

Also contemplated are devices that incorporate one or more the phototropic mixtures as described herein.

DETAILED DESCRIPTION OF THE INVENTION

Figure 1:
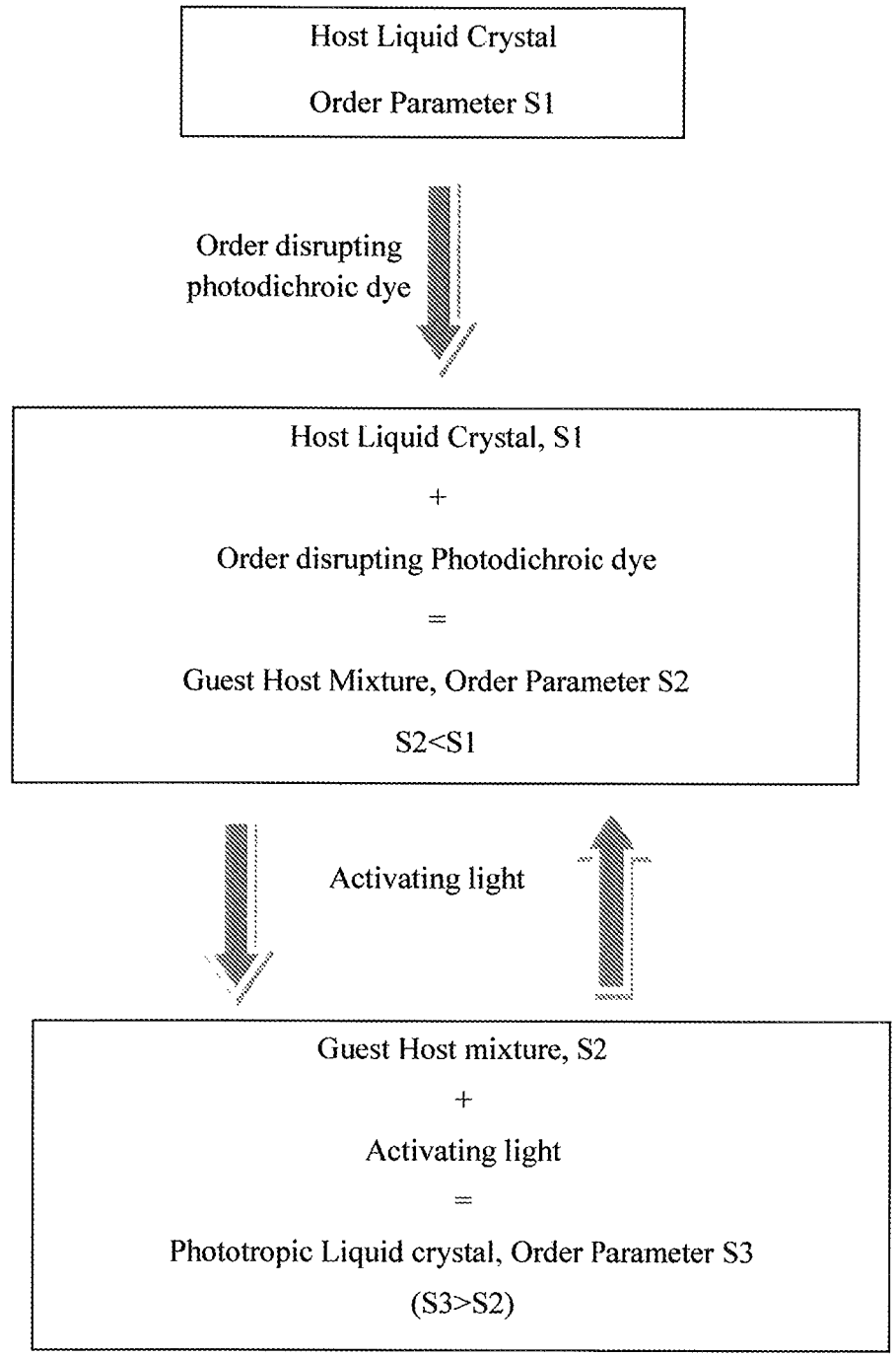
FIG. 1 is a schematic representation of the effect of the photodichroic dye and activating light on a host liquid crystal and the resulting order parameter changes.

Disclosed herein are phototropic liquid crystal mixtures comprising a liquid crystal host and one or more photodichroic dyes, where exposure of the mixture to an activating light increases the order parameter of the mixture.

A phototropic mixture is defined as any mixture which exhibits an order parameter increasing behavior from a thermodynamically stable ground state to a higher order upon illumination with an activating light.

In some embodiments, a phototropic liquid crystal mixture, when in an excited state (i.e. when activated by an activating light) will display liquid crystalline characteristics. These liquid crystalline characteristics are well known in the art and include birefringence, absorption, color, optical reflection band, surface tension, and mechanical properties of polymeric liquid crystalline systems. A phototropic liquid crystal mixture may also undergo transition from an isotropic material to one with liquid crystal properties upon exposure to an activating light, or from a liquid crystalline phase with a lower order to one with a higher order (e.g. nematic to smectic transition).

In some embodiments, the mixture is considered phototropic if the order parameter of the LC host material without the photodichroic dye and without the activating light is lower than the order parameter of the mixture containing photodichroic dye in the presence of the activating light. Furthermore, the order parameter of the phototropic mixture in the absence of the activating light is lower than the order parameter of the LC host material without the presence of the photodichroic dye. One example of this is to start with a liquid crystal material with a specified order parameter and then add one or more photodichroic dyes in sufficient amount so as to decrease the order parameter of the mixture by at least 10%, 15%, 20%, 30%, 40%, 50%, 60%, 70%, 80%, 90%, or completely destroy the order parameter and reduce it to 0 relative to the original order parameter of the host at the same temperature. Then upon light exposure, the system will increase its order parameter by an amount larger than the amount lost due to the addition of the dyes.

To achieve the above unique phenomena, it is necessary to use a photodichoric dye which is order disrupting in the ground state but order enhancing in the excited state. In other words, the order parameter of the photodichroic dye in the photoexcited state must be larger than the order parameter of the host by itself. In addition, the order parameter of the photodichroic dye in the unexcited state must be lower than the host by itself. Furthermore, the dye must be soluble in the host in excess of 0.1%, 0.2%, 0.5%, 0.7%, 1% WT or any value in between, preferably 2%, 3%, 4%, 10%, 20%, 30%, 40%, up to 50% WT and any value in between. It should be noted that if in some example, the solubility of the dye is more than 50%, then the photodichoric dye is acting as the host as well as the photodichoric guest. This is considered to be a special case of the phototropic mixture discussed above but remains a phototropic system.

It is known by people skilled in the art that the mixture should be a proper selection between the host liquid crystal and the photodichroic dye which satisfy three conditions (described below): the photodichroic dye should be (1) soluble in the host, (2) order-disrupting in the ground state and (3) order enhancing in the excited state.

A method to determine if the system is demonstrating the phototropic behavior described is to examine the phase transition temperature wherein the material undergoes a phase transition from meso phase to either an isotropic phase or inter mesogenic phases. For example, the temperature for the nematic to isotropic phase transition is defined as $T_{NI}$ and is correlated with the order parameter of a nematic mixture. In particular, it is well known in the art that the $T_{NI}$ of a mixture is reduced if the order parameter of the mixture is also reduced and the $T_{NI}$ of the mixture is increased if the order parameter of the mixture is increased.

Optical properties of material undergo a significant change if the material undergoes a phase transition. For example, a phase transition from isotropic to nematic phase can demonstrate a large change in optical properties such as birefringence. This change in optical property has numerous applications in optical or photonic devices. Therefore contemplated herein are phototropic mixtures that demonstrate a phase change during the photoactivation.

One method to achieve this is to increase the surrounding temperature of the phototropic mixture to a value which is above the phase transition temperature of the mixture. In this case, the mixture exhibits a lower order phase when it is above its phase transition temperature. Upon excitation of the phototropic mixture with an activating light, the order parameter of the mixture is increased and the mixture reverts back to a more ordered state.

In some examples, a system can be designed such that the light-induced increase in order parameter of the phototropic mixture induces a phase transition from an isotropic phase to a nematic phase.

In some examples, a system can be designed such that the light-induced increase in order parameter of the phototropic mixture induces a phase transition from an isotropic phase to a cholesteric or chiral nematic phase.

In some examples, a system can be designed such that the light-induced increase in order parameter of the phototropic mixture induces a phase transition form a nematic phase to a smectic phase.

Photodichroic Dyes

The photodichroic dye is photoactivated by an activating light. Furthermore, the photoactivated photodichroic dye has a long molecular configuration when it is in an excited state, and a shorter, rounded or flat configuration when it is in the ground state. Photodichroic dyes are dyes which exhibit dichroism in the photoexcited state. In other words, they exhibit a different optical response such as absorption or birefringence to two orthogonally polarized light. They may also exhibit dichroism in the unexcited, ground state but that property is not as pronounced as in the excited state. The photodichroic dyes may be positive or negative in that the absorption dipole can orient parallel or perpendicular to its molecular long axis. These photodichroic dyes contain a conventional photochromic core unit and a mesogenic group that is capable of dichroism and light polarization when activated with an activating light and in a spatially ordered configuration.

In the past, dyes which are compatible with LC hosts, i.e. do not significantly disrupt the LC order, and have an absorption band in the visible region of light in the photoexcited state have been suggested for use as a polarized photochromic systems in some applications such as Patent Applications US 2010/324296 A1 (Ser. No. 12/446,059) and US 2010/0202033 A1 (Ser. No. 12/439,738).

However, the presently described photodichroic dyes have the unique property that when mixed with particular LC hosts, they significantly disrupt the LC host's order parameter in the ground state but increase the phototropic mixture order parameter in the excited state. In some examples, the order parameter of the phototropic mixture is increased beyond the original order parameter of the host LC.

Photochromic core units that can be used in the photodichroic dyes described herein are represented, but not limited by photochromic units such as a 3H-naphto[2,1-b]pyran, 2H-naphtho[1,2-b]pyran, 2H-naphto[2,3-b]pyran, chromene, spirofluorene-(2H)-benzopyran, indeno-fused naphthopyran, spirooxazine, homoazaadamantane spirooxazine, spyropyran, spiroindoline[2,3']benzoxazine, diarylethene, fulgide, fulgimide. The photochromic core units do not include azo dyes.

Mesogenic groups include moieties that are structurally compatible with the formation of liquid crystal phases in the molecular system in which they exist. Mesogenic groups contain at least one ring or preferably two rings or more, connected to each other through a covalent bond or a linking unit.

The rings, which may be identical or different, may include 5- or 6-membered aromatic or non-aromatic rings. The rings may be selected independently from benzene, substituted benzene, naphthalene, substituted naphthalene, cyclohexane, substituted cyclohexane, heterocyclic rings and substituted heterocyclic rings. Examples of heterocyclic rings include 5- or 6-membered rings and may include one or more members selected from nitrogen, oxygen, and sulfur.

Examples of mesogenic groups include groups that may be represented by the following formulas:

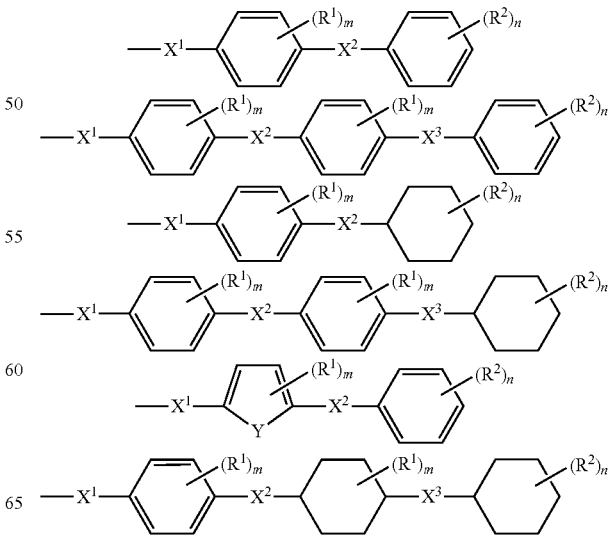

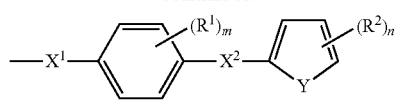

wherein each $R^1$ and $R^2$, is selected independently from the group consisting of hydrogen, halogen, —$R^a$, —OH, —$OR^a$, —O—$COR^a$, —$CO_2R$, —SH, —$SR^a$, —$NH_2$, —$NHR^a$, —$NR^aR^a$, —$NR^bR^c$, wherein $R^a$ is a linear or branched ($C_{1-18}$)alkyl group, a linear or branched ($C_{1-18}$)alkenyl group or a linear or branched ($C_{1-18}$)haloalkyl group, $R^b$ and $R^c$ are independently selected from the group consisting of hydrogen and linear or branched ($C_{1-18}$)alkyl groups, or wherein $R^b$ and $R^c$ combine to form a saturated 5- to 7-member heterocyclic group, n is an integer from 1 to 5, m is an integer from 0 to 4, $X^1$, $X^2$, and $X^3$, identical or different from each other, are covalent bonds or linking units, and wherein Y is oxygen, nitrogen, or sulfur. Linking units include divalent organic groups. Examples of linking units include alkyl, ether, ester, ethylene, acetylene, imino, azo, and thio groups. Linking units include groups that may be represented by the formulas —$R^d$—, —O—, —$OR^d$—, —$OR^dO$—, —OCO—, —COO—, —$OCOR^d$—, —$OCOR^dO$—, —S—, —CH=CH—, —CH=N—, —C≡C—, wherein $R^d$ is a linear or branched ($C_{1-18}$)alkyl group or a linear or branched ($C_{1-18}$) haloalkyl group.

Examples of photodichroic dyes containing a photochromic core unit and a mesogenic group include:

(a)

(b)

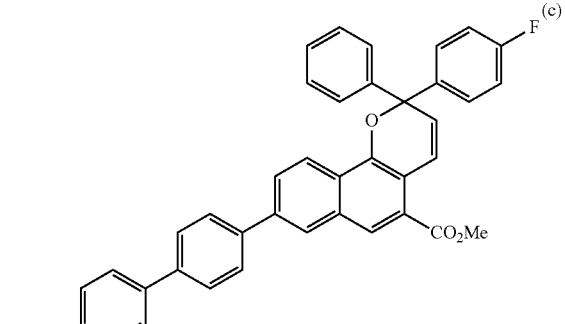

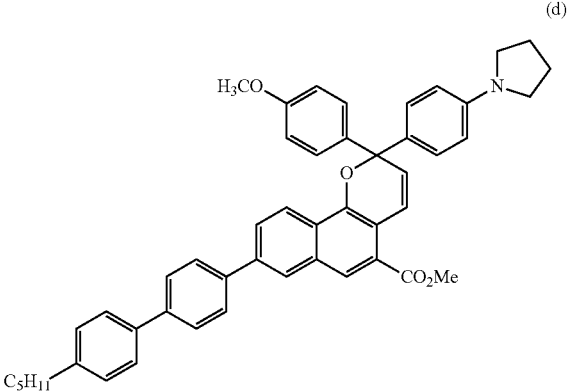

In the case herein, one or more photodichroic dyes are added to a liquid crystal host. The host can be a nematic, chiral nematic or cholesteric, smectic, polymeric or other liquid crystal phases. Examples of liquid crystal materials that can be used are a single component liquid crystal like 5CB from Merck or eutectic mixtures such as ZLI2806 from Merck. The host can have positive or negative dielectric anisotropy. In some embodiments, the Liquid crystalline materials contain a biphenol core component like 5CB, 7CB, E44, E7 or alike as well as a fluorinated mesogenic component such as found in ZLI 2806, ZLI 6609, ZLI 4788 or alike.

Also contemplated herein are methods for increasing an order parameter of a liquid crystal mixture by adding a photodichroic dye to the liquid crystal mixture to make a phototropic liquid crystal mixture, and exposing said phototropic liquid crystal mixture to an activating light, thereby increasing the order parameter of the liquid crystal mixture. A phototropic liquid crystal mixture according to the invention can be used in several applications. In particular, it can be utilized in all applications wherein nematic, smectic, cholesteric or polymeric systems are used. The key distinction is that these systems can be driven to operate by an external activating light. As such, the system will perform as a photoresponsive liquid crystal material. Therefore, also contemplated herein are devices comprising any of the phototropic mixtures described herein.

DEFINITIONS

As used herein, "activating light" refers to a light with a certain wave length that matches the ground state absorption band of a selected photodichroic dye such that it induces a configuration change in the photodichroic dye. A configuration change is a change that causes a change in the absorption band of the dye or changes the color of the dye. An activating light is wavelength matches the ground state absorption of a selected photodichroic dye such that it typically induces a configuration change in the photodichroic dye. It is typically accompanied by a change in the shape of the molecule such as traditionally observed in azo based cis-trans isomerization system.

"Absorption band" as used herein is to define the spectral band within which a material exhibits absorption of an incident photon or light. "Excited state absorption spectra" is the wavelength dependence of the photodichroic dye absorption in the excited state. "Ground state absorption spectra" is the wavelength dependence of the photodichroic dye absorption in its thermodynamically stable ground state.

"Excited state" is a thermodynamic state in which a material can enter upon excitation by an activating light. The lowest thermodynamically stable state of a material or system is defined as "ground state" herein. "Thermodynamically stable" is as defined in the "The Physics of Liquid Crystals" by P. G. De Genne and J. Prost, Oxford University Press, USA; 2 edition (Aug. 10, 1995). In photodichroic dyes, the corresponding configuration of the molecule in the ground and excited states are typically different.

"Isotropic", "nematic", "smectic", and "cholesteric" as well as all other meso phases are used in the same sense as used in "Liquid Crystals" by Peter J. Collings, Princeton Univ Pr; First Edition (1990). "Mesogenic materials" are materials which exhibit meso phases.

"Order parameter" of the liquid crystal, dichroic dye and guest-host mixture as used herein is defined in "Liquid Crystals Application and Uses" Edited by B. Bahadur, World Scientific (1992). Generally, the statistically averaged orientation of the elongated liquid crystal molecules and the photodichroic dye in a guest-host mixture points in a particular direction that is called the director. Since all molecules in the mixture are subject to random thermal motion as they diffuse, each molecule will not point in exactly the same direction as the director, even in the presence of an external field. The degree of general order can be characterized and calculated by a useful quantity called the order parameter, S, which ranges in value from 0 to 1 for calamitic liquid crystal. An order parameter of S=1 corresponds to all molecules being perfectly aligned with the director. An order parameter of S=0 corresponds to complete random orientation of the molecules with respect to a director. In particular, isotropic liquids will exhibit an order parameter of S=0. Liquid crystalline materials exhibit an order parameter in between S=0 and S=1. More generally, they typically exhibit an S between 0.4 and 0.85.

Any other term not specifically defined herein will have the same definition as in "Liquid Crystals Application and Uses", by B. Bahadur, World Scientific (1992).

Example 1

Figure 2:
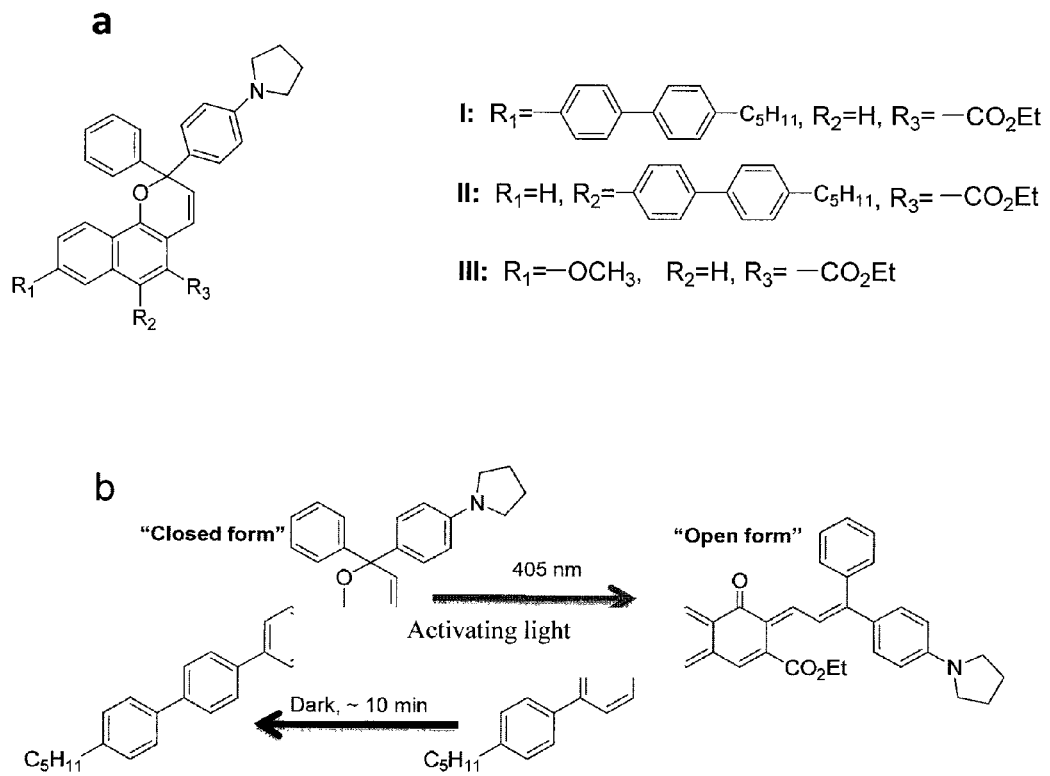
FIG. 2a shows the chemical structures of naphthopyran-based materials I, II, III discussed in the Examples.
FIG. 2b shows the photoinduced ring opening of Ethyl 8-(4-pentylbiphenyl)-2-phenyl-2-(4-pyrrolidinophenyl)-2-H-naphtho[1,2-b]pyran-5-carboxylate ("I") to UV light exposure.

A series of naphthopyran molecules were synthesized with systematic substitution of a mesogenic group (biphenyl with a para substituted pentyl group) in two positions of a naphthopyran core (molecules I, II, and III in FIG. 2a). The molecules were prepared by the acid catalyzed condensation of ethyl 7-bromo-4-hydroxy-2-naphthalenecarboxylate (I), 4-bromo-2-naphthol (II), or ethyl 7-methoxy-4-hydroxy-2-naphthalenecarboxylate (III) with 1-phenyl-1-(4-pyrrolidin-1-ylphenyl)prop-2-yn-1-ol, followed by Suzuki coupling with 4-pentylbiphenylboronic acid (I and II). The photoinduced conformational change of molecule I from the closed to open form is illustrated in FIG. 2b. Evident in the chemical structures of I, the molecule is bent in the ground state and becomes elongated and planar in the exposed state.

Figure 3:
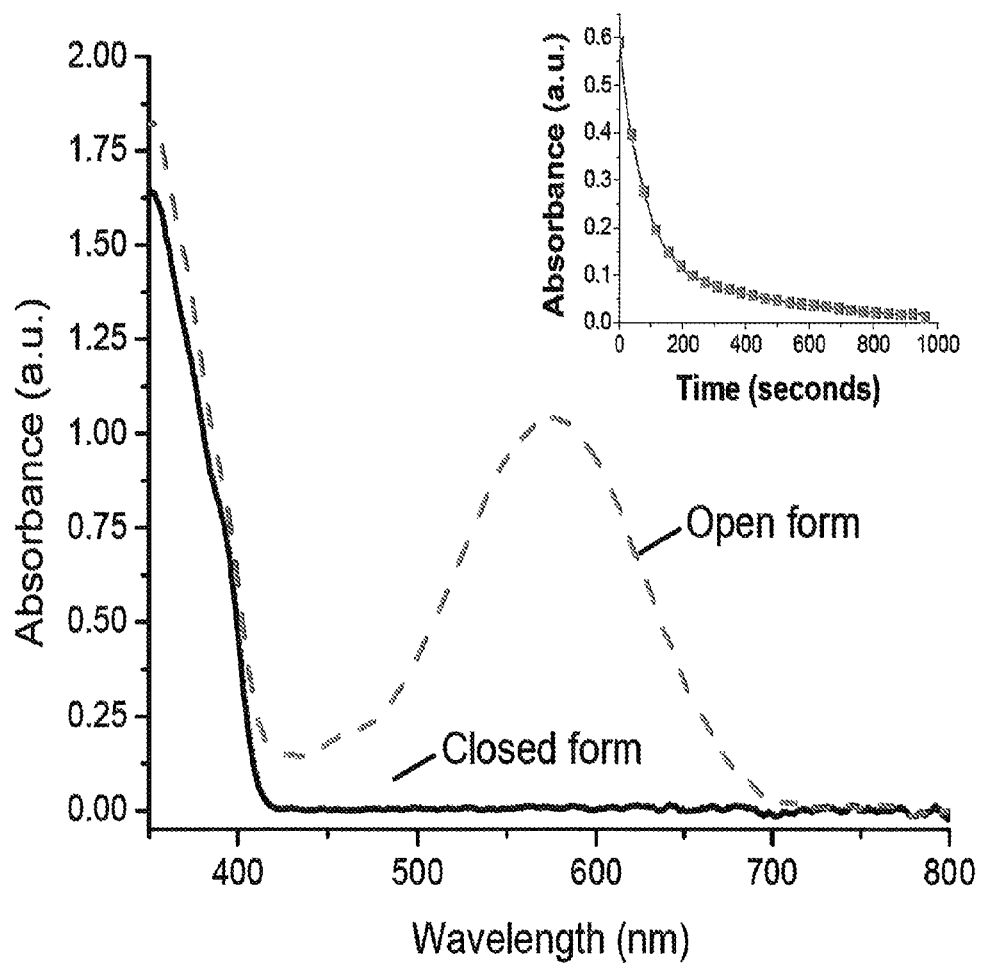
FIG. 3 is a graph showing the bathochromic shift in absorbance of material I (1 wt % mixed into ZLI-4788) upon exposure to 2 mW/cm2 of 405 nm irradiation, where the solid line represents closed form and the dashed line represents the open form. The inset shows the biexponential decay of material I from the open form to the closed form is rapid, restoring in approximately 1000 seconds.
Figure 4:
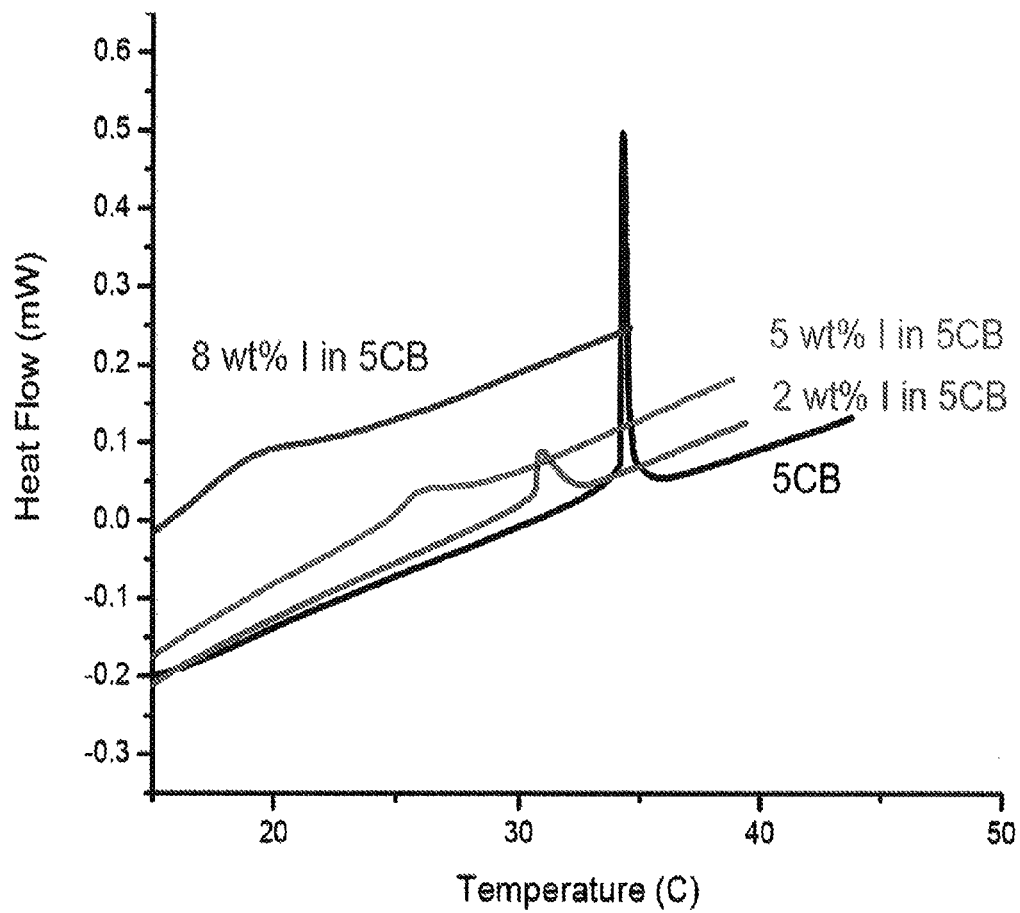
FIG. 4 is a graph showing the DSC thermograms of mixtures of material I with the room temperature nematic liquid crystal n-pentyl cyanobiphenyl (5CB) with increasing concentration of material I. Increasing the concentration of material I shifts the nematic to isotropic transition temperature of the I/5CB mixtures, confirming material I is order-disrupting in the closed form.

The photodichroism of I, when mixed at 1 wt % into the nematic liquid crystal mixture ZLI-4788 from Merck is shown in FIGS. 3 and 4. As apparent in FIG. 3, the material does not absorb in the visible spectrum while in the closed form. Exposure of the mixture to 365 or 405 nm light changes the conformation of the molecule which correspondingly shifts the resonant structure, resulting in a shift in the absorption peak to 603 nm. Important for practical utility, the photoinduced changes are short-lived and reversible, as the material biexponentially decays back to the ground state in a few minutes (inset to FIG. 3). Because of the mesogenic substitution, molecule I exhibits good solubility in liquid crystal hosts. However, because of the bent shape apparent in FIG. 2b, doping increasing concentrations of I into a model, single component liquid crystal host such as n-pentyl cyanobiphenyl (5CB) shifts the nematic to isotropic phase transition temperature (measured by DSC) to lower temperatures (FIG. 4). This confirms that shape of the ground state form of I is order-disrupting when mixed as a guest molecule into liquid crystalline hosts.

Figure 5:
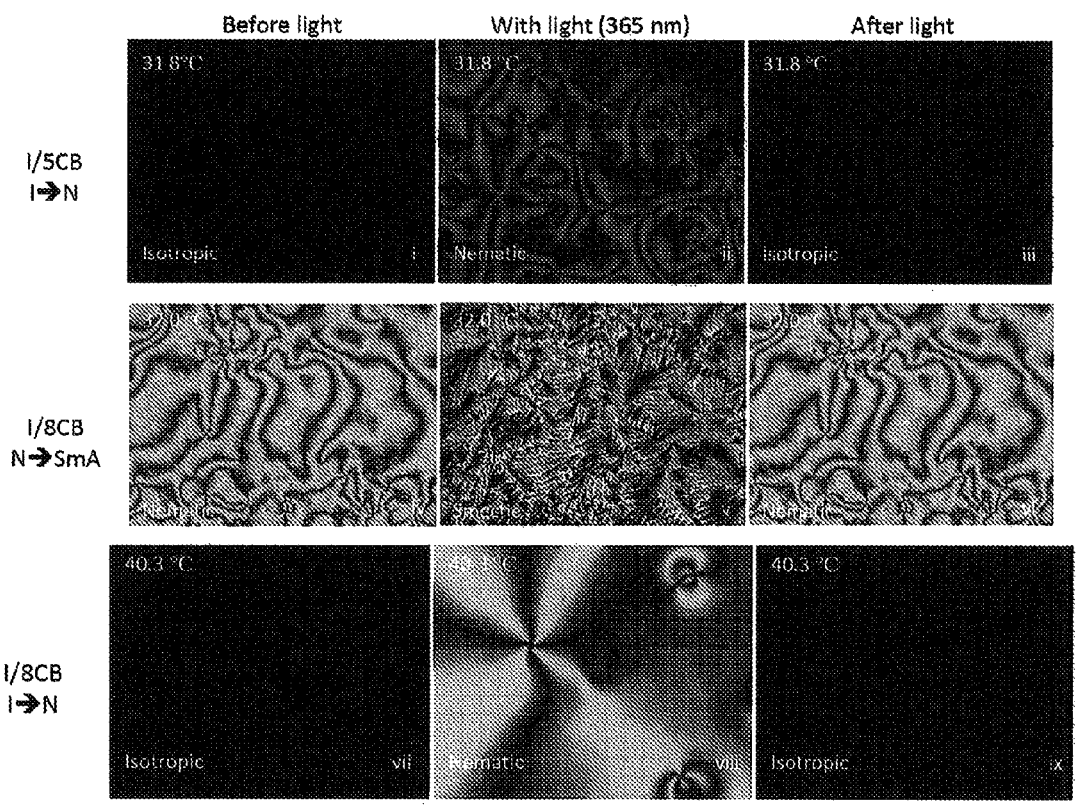
FIG. 5 shows polarized optical micrographs of phototropic phase transitions of material I (2.4 wt %)/5CB and I (1.8 wt %)/8CB. Images were taken before light exposure, during light exposure (365 nm UV light, 5 mW/cm2), and after light exposure. Images i-iii illustrate the phototropic isotropic to nematic transition observed in the mixture of material I and 5CB, at 31.8° C. Images iv-vi confirm that higher order transitions can be observed, such as a photoinduced nematic to smectic transition in the I/8CB mixture observed at 32.0° C. The phototropic transition from isotropic to nematic is also observed in I/8CB at 40.3° C., as shown in vii-ix.

Phase transitions to higher order phases was achieved in two representative systems by observing the materials under polarized optical microscopy (POM) before, during, and after UV exposure to 5 mW/cm$^2$ 365 nm light to ascertain the ability of this class of molecules to trigger order-increasing phase transitions. POM is a widely used technique to characterize liquid crystal phase transitions, which appear as characteristic textures associated with the birefringence of nematic, smectic, and cholesteric liquid crystal phases. A mixture composed of 2.4 wt % I and 5CB is heated past the isotropic phase transition (31.8° C.). Due to the lack of birefringence in the isotropic state of the mixture, the image in POM (FIG. 5 i) was black under cross polarization condition. Exposure to UV light generated colored texture (FIG. 5 ii) indicative of a birefringent phase in the cell that is identified as a liquid crystalline nematic phase as known in the art. This photo induced nematic phase reverted back to the isotropic phase within five seconds after removal of the UV light (FIG. 5 iii).

Example 2

Comparatively higher order phase transitions can be induced as well, demonstrated here in a mixture of 1.8 wt % of I and 8CB. 8CB is a single component liquid crystal with a room temperature SmA phase and exhibits a SmA to nematic transition at 34° C. and a nematic to isotropic transition at 41° C. With the addition of 1.8 wt % of I, the phase transition temperature for SmA to nematic in 8CB decreases to 30.5° C. while the nematic to isotropic phase transition temperature decreases to 39.0° C. The POM micrograph at 32.0° C. reveals a texture characteristic of a nematic phase (FIG. 5 iv). UV exposure of this I/8CB mixture at 32.0° C. induces a transition from nematic to SmA phase as observed by presence of fan textures known in the art (FIG. 5 v). Once again, upon removal of the UV light the material nearly immediately reverts back to the nematic phase confirming the phototropic nature of the phase (FIG. 5 vi). After allowing I to revert to the ground state, the sample was heated to 40.3° C. to transition the I/8CB mixture into the isotropic phase. Light exposure can also induce a phase transition from the isotropic to nematic phase in the I/8CB mixture (FIG. 5 vii-ix). In both the I/5CB and I/8CB mixtures, light exposure is generating order-increasing transitions, a new paradigm in photoresponsive liquid crystals. Identical phase transitions are observable in aligned cells.

Example 3

Figure 6:
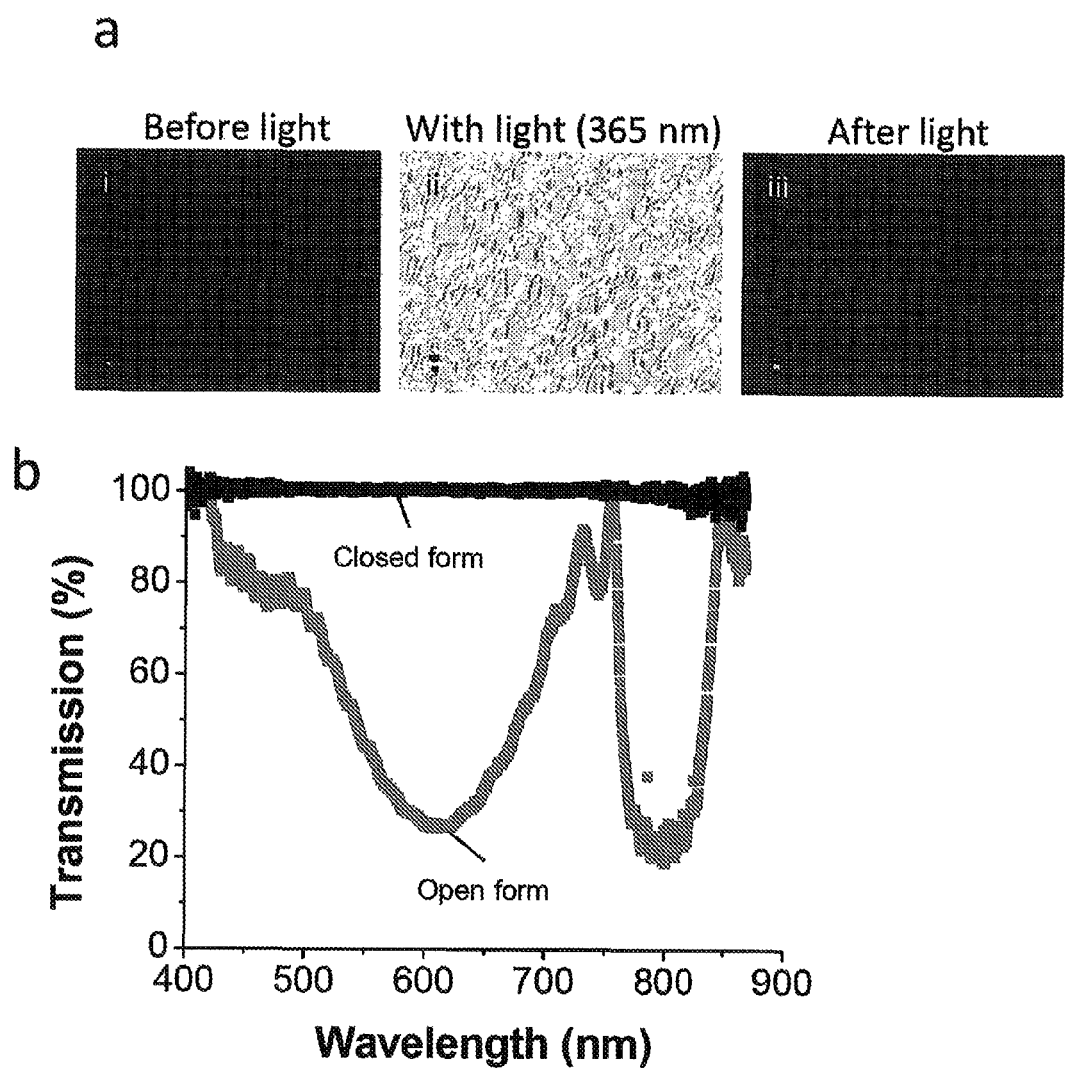
FIG. 6 is a photographic and graphic demonstration of the phototropic phase transition of material I (4.0 wt %) mixed with R1011 (6 wt %)/5CB. a) shows polarized optical micrographs of phototropic phase transitions with exposure to 5 mW/cm2 365 nm UV light. i) Before exposure, ii) during exposure, and iii) after exposure. b) is a graph showing the transmission spectra of mixture before (top line—closed form) and during UV exposure (bottom line—open form).

Two of the most practical geometries to showcase the potential utility of light induced liquid crystallinity are the cholesteric liquid crystal phase and the twisted nematic geometry. A cholesteric liquid crystal mixture capable of photo-induced phase transitions was formulated by mixing the commercially available from Merck chiral dopant R1011 with 5CB. To this mixture, 4.0 wt % of I was added—disrupting the cholesteric phase and forming an isotropic liquid at room temperature (FIG. 6a i). As observed in the POM images, UV light induced an isotropic to cholesteric phase transition, evident by appearance of a Grandjean texture (FIG. 6a ii). Removal of light returns the I/R1011/5CB mixture to the isotropic state (FIG. 6a iii). The photoinduced cholesteric phase is further elucidated in FIG. 6b, which plots transmission spectra before UV exposure and during UV exposure. As evident in FIG. 6b, the mixture is transparent in visible spectrum before light exposure (no absorption or reflection). However, upon exposure to 365 nm light an absorption band appears (centered at 603 nm) and the reflection bandgap from the cholesteric phase appears at 800 nm. Although intentionally separated in FIG. 6b, the absorption and reflection bands can easily be overlapped to yield high contrast, dichroic, optical materials. The prospect of spatial patterning the photoresponsive material system was demonstrated by using a mixture of I in 5CB placed in a glass cell with a twisted-nematic geometry. The cell is illuminated from below with a polarized light table and viewed through a crossed analyzer. Initially, the cell appears dark as the mixture is isotropic at room temperature. Upon light exposure through the mask, the exposed areas undergo a transition into the nematic phase which permits light to transmit through the crossed analyzer. Upon removal of the mask, it is clear that the photoinduced nematic phase is retained (briefly).

Example 4

Figure 7:
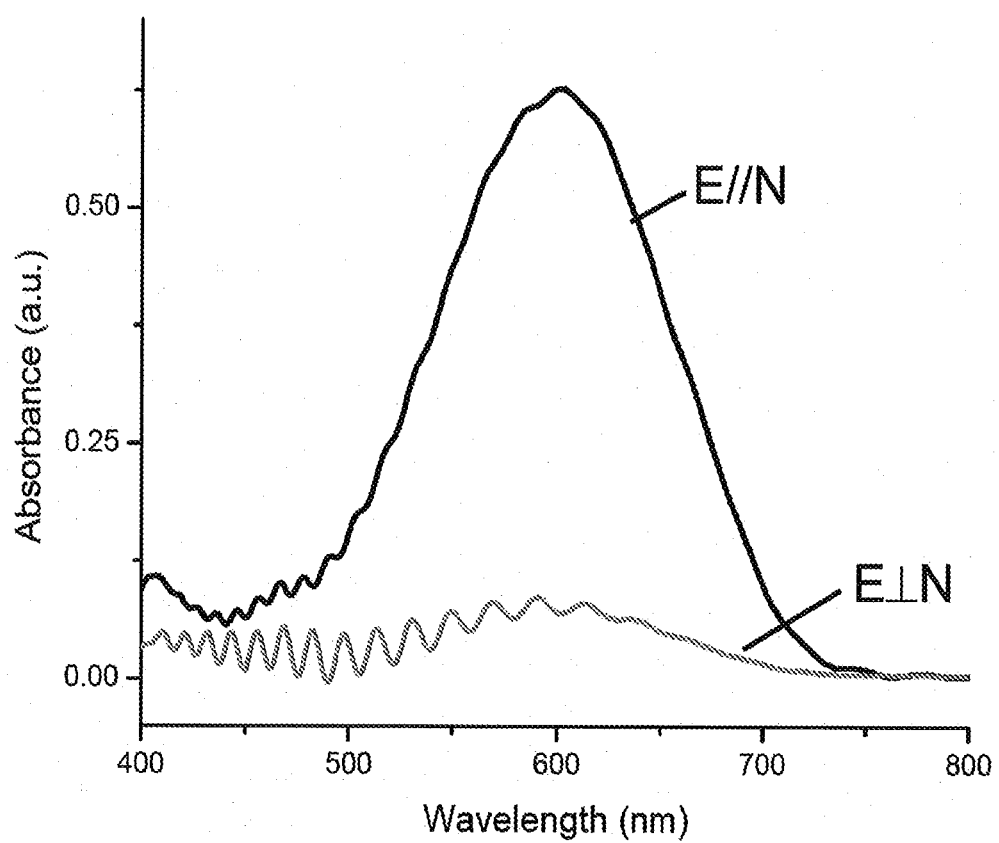
FIG. 7 is a graph showing the photo-induced dichroism observable in a mixture of 1 wt % material I with the nematic liquid crystal ZLI-4788 subjected to continuous exposure from 2 mW/cm2 of 405 nm irradiation When the polarization of the white light probe is parallel to the nematic director of the liquid crystal mixture, the bathochromic absorbance of material I in the open form centered at 603 nm is strong (E//N). Rotating the polarization of the white light probe such that it is orthogonal to the nematic director of the liquid crystal mixture reveals the large, photoinduced dichroism of I (E⊥N).

In addition to enabling the distinctive ability to use light to induce liquid crystallinity, as summarized in Table 1, the open form of the molecules can exhibit a large order parameter greatly exceeding prior reports. From the variation of the substitution pattern in molecules I-III, it is apparent that both the utilization of a mesogenic group as well as the position of the unit are factors enabling the observance of large, photo-induced order parameter in molecule I. The importance of utilization of the mesogenic substituent is apparent by comparing the order parameter of molecules I and III while the importance of positioning the mesogenic substituent is apparent in the comparison of molecules I and II. The photoinduced dichroism of the I/ZLI-4788 mixture is presented in FIG. 7. During continuous exposure to 405 nm irradiation, the dye exhibits considerable absorption when the white light probe is polarized parallel to the nematic director of the alignment cell. When the white light probe is polarized orthogonal to the nematic director of the alignment cell, the material exhibits limited absorption.

TABLE 1

| Compound Name | $\lambda_{max}$ of Open Form | Order Parameter of Open Form |
|---|---|---|
| I | 603 | 0.72 |
| II | 600 | 0.33 |
| III | 597 | 0.43 |

This written description sets forth the best mode of carrying out the invention, and describes the invention so as to enable a person of ordinary skill in the art to make and use the invention, by presenting examples of the elements recited in the claims. The patentable scope of the invention is defined by the claims, and may include other examples that occur to those skilled in the art. Such other examples, which may be available either before or after the application filing date, are intended to be within the scope of the claims if they have structural or method elements that do not differ from the literal language of the claims, or if they have equivalent structural or method elements with insubstantial differences from the literal language of the claims.

The invention claimed is:

1. A phototropic mixture comprising:
   a liquid crystal host and one or more photodichroic dyes, the mixture being in an isotropic phase in an unexcited state, transitioning to a liquid crystalline phase upon exposure to an activating light and returning to the isotropic phase upon removal of the activating light.

2. The phototropic mixture of claim 1, wherein the mixture transitions from the isotropic phase to a nematic liquid crystalline phase upon exposure to the activating light.

3. The phototropic mixture of claim 1, wherein the mixture transitions from the isotropic phase to a cholesteric liquid crystalline phase upon exposure to the activating light.

4. The phototropic mixture of claim 1, wherein in the unexcited state the phototropic mixture has a lower $T_{NI}$ phase transition temperature than the liquid crystal host.

5. The phototropic mixture of claim 1, wherein upon exposure to the activating light the phototropic mixture has a higher $T_{NI}$ phase transition temperature than the liquid crystal host.

6. The phototropic mixture of claim 1, wherein the photodichroic dye is a compound comprising a non-azo-based photochromic core unit and a mesogenic group and is soluble in the liquid crystal host in excess of 1% WT.

7. The phototropic mixture of claim 1, wherein the mixture comprises a photodichroic dye concentration of 1.8% WT or above.

8. A method for inducing a light-induced order-increasing transition in a mixture, the method comprising:
   making a phototropic mixture by adding a sufficient amount of one or more photodichroic dyes to a liquid crystal host to decrease an order parameter of the phototropic mixture relative to an order parameter of the liquid crystal host at the same temperature;
   exposing the phototropic mixture to an activating light, thereby causing the phototropic mixture to increase its order parameter by an amount larger than the amount lost due to the addition of the photo-dichroic dye to the liquid crystal host.

9. The method of claim 8, further comprising reversing the effect of the activating light by removing the activating light.

10. The method of claim 8, wherein adding the one or more photodichroic dyes to the liquid crystal host results in reducing the order parameter of the phototropic mixture by at least 10% relative to the order parameter of the liquid crystal host at the same temperature.

11. The method of claim 8, wherein adding the one or more photodichroic dyes to the liquid crystal host results in reducing the order parameter of the phototropic mixture to 0 at the same temperature.

12. The method of claim 8, wherein exposing the phototropic mixture to the activating light causes the phototropic mixture to undergo a phase transition from an isotropic phase to a nematic phase.

13. The method of claim 8, wherein exposing the phototropic mixture to the activating light causes the phototropic mixture to undergo a phase transition from an isotropic phase to a cholesteric phase.

14. The method of claim 8, wherein exposing the phototropic mixture to the activating light causes the phototropic mixture to undergo a phase transition from a nematic phase to a smectic phase.

15. The method of claim 8, wherein the photodichroic dye is a compound comprising a non-azo-based photochromic core unit and a mesogenic group, and wherein the phototropic mixture comprises a photodichroic dye concentration of 1.8% WT or above.

16. A liquid crystal device comprising:

a phototropic mixture comprising a liquid crystal host and a photodichroic dye, wherein the photodichroic dye is order disrupting in an unexcited ground state and order enhancing in an excited state upon exposure to an activating light, and wherein the photodichroic dye returns to its unexcited state upon removal of the activating light.

17. The liquid crystal device of claim 16, wherein the photodichroic dye is soluble in the liquid crystal host in excess of 1% WT.

18. The liquid crystal device of claim 16, wherein the phototropic mixture comprises a photodichroic dye concentration of 1.8% WT or above.

19. The liquid crystal device of claim 16, wherein the phototropic mixture has an order parameter that is lower than an order parameter of the liquid crystal host by itself when the phototropic mixture is in the unexcited state and is higher than the order parameter of the liquid crystal host by itself when the phototropic mixture is in the excited state.

20. The liquid crystal device of claim 16, wherein the phototropic mixture has an isotropic phase in the unexcited state and a nematic liquid crystalline phase in the excited state.

21. The liquid crystal device of claim 16, wherein the phototropic mixture has an isotropic phase in the unexcited state and a cholesteric liquid crystalline phase in the excited state.

22. The liquid crystal device of claim 16, wherein the phototropic mixture in the unexcited state has a lower $T_{NI}$ phase transition temperature than the liquid crystal host.

23. The liquid crystal device of claim 16, wherein the phototropic mixture in the excited state has a higher $T_{NI}$ phase transition temperature than the liquid crystal host.

24. A phototropic mixture comprising:

a liquid crystal host and one or more photodichroic dyes, wherein the photodichroic dye is order disrupting in an unexcited ground state and order enhancing upon excitation by an activating light.

25. The phototropic mixture of claim 24, wherein the phototropic mixture has an order parameter that is lower than an order parameter of the liquid crystal host when the phototropic mixture is in the unexcited state and is higher than the order parameter of the liquid crystal host when the phototropic mixture is in the excited state.

26. The phototropic mixture of claim 24, wherein the photodichroic dye is a compound comprising a non-azo-based photochromic core unit and a mesogenic group and is soluble in the liquid crystal host in excess of 1% WT.

27. The phototropic mixture of claim 24, comprising a photopdichroic dye concentration of 1.8% WT or above.

* * * * *